(12) United States Patent
Waletzko et al.

(10) Patent No.: US 7,754,266 B2
(45) Date of Patent: Jul. 13, 2010

(54) APPARATUS FOR AND METHOD OF MAKING A FROZEN CONFECTIONERY PRODUCT

(75) Inventors: David Waletzko, Minneapolis, MN (US); Daniel Celotta, Inver Grove Heights, MN (US); Jonathan Paul Robelia, Maplewood, MN (US); Micah Todd Cook, Burnsville, MN (US); Rupa Kilaparti, Minneapolis, MN (US); Paul Joseph Henry, Andover, MN (US); Daniel Theodore Noes, Coon Rapids, MN (US); William K. Durfee, Edina, MN (US)

(73) Assignee: Frigid Fresh Ice Cream, Inc, San Francisco, CA (US)

( * ) Notice: Subject to any disclaimer, the term of this patent is extended or adjusted under 35 U.S.C. 154(b) by 834 days.

(21) Appl. No.: 10/997,262

(22) Filed: Nov. 24, 2004

(65) Prior Publication Data

US 2006/0110515 A1 May 25, 2006

(51) Int. Cl.
*A23G 9/12* (2006.01)

(52) U.S. Cl. .................. 426/524; 426/519; 426/565; 99/455; 99/459

(58) Field of Classification Search ............... 99/455, 99/459; 426/565, 519, 524; 366/149, 601; 126/268; 62/48.1, 457.1, 340–345, 913
See application file for complete search history.

(56) References Cited

U.S. PATENT DOCUMENTS

| | | | | |
|---|---|---|---|---|
| 2,115,742 A | * | 5/1938 | Newton | 366/222 |
| 2,409,067 A | | 10/1946 | Reed | |
| 3,068,105 A | | 12/1962 | Morrison | |
| 4,664,529 A | * | 5/1987 | Cavalli | 366/149 |
| 4,716,822 A | * | 1/1988 | O'Brien | 99/455 |
| 4,993,238 A | | 2/1991 | Inagaki | |
| 5,098,732 A | | 3/1992 | Inagaki | |
| 5,566,732 A | * | 10/1996 | Nelson | 141/94 |
| 6,510,890 B1 | | 1/2003 | Paskach et al. | |
| 2003/0024401 A1 | * | 2/2003 | Zetterlund | 99/452 |
| 2004/0107844 A1 | * | 6/2004 | Kennedy et al. | 99/455 |

OTHER PUBLICATIONS http://web.archive.org/web/20020601205541/http://education.jlab.org/beamsactivity/other/ln2icecream/.*
Nicholas Kurti and Nerve This-Benckhard, "Chemistry and Physics in the Kitchen," Scientific American, Apr. 1994, pp. 66 and 71 (4 pages).

(Continued)

*Primary Examiner*—Drew E Becker
*Assistant Examiner*—Steven Leff
(74) *Attorney, Agent, or Firm*—Lumen Patent Firm

(57) ABSTRACT

Apparatus for producing a serving of frozen confectionery product is characterized by a supply of liquid gas, a support for removably carrying a disposable container that holds a volume of unfrozen confectionery mix, and a holder for releasably holding a disposable agitator, such that the agitator extends into confectionery mix in the container. A valve controllably dispenses liquid gas into the confectionery mix in the container while relative motion is imparted to the container and agitator to agitate and admix the confectionery mix and liquid gas while the liquid gas mix evaporates to cool and freeze the confectionery mix, through a transfer of heat from the confectionery mix to the liquid gas and through the latent heat of evaporation of the liquid gas, to produce the frozen confectionery product.

1 Claim, 2 Drawing Sheets

OTHER PUBLICATIONS

Brian P. Coppola, et al., "I Scream, You Scream . . . A New Twist on the Liquid Nitrogen Demonstrations," Journal of Chemical Education, Dec. 1994, vol. 71, No. 12, p. 1080 (2 pages).

David A Katz, "Liquid Nitrogen Ice Cream," http://www.chymist.com/Liquid%20N2%/20ice%20cream.pdf (Accessed Apr. 28, 2008) (1 page).

H. Henry Rieke IV, "Cooking with Chemistry," http://www.polsci.wvu.edu/Henry/Icecream/Icecream.html (Accessed Apr. 25, 2008) (3 pages).

Peter Barham, "The Science of Cooking," ISBN 3-540-67466-7, Springer-Verlag, Berlin, Heidelberg, New York, p. 143 (3 pages).

"Liquid Nitrogen Ice Cream," available at http://www.schnozzle.orgi/~paulh/recipes/icecream.pdf and http://www.ed.sc.edu/ipd/high/icecream-nitrogen.pdf, undated (3 pages).

Anne Marie Helmenstine, Ph.D., "How to Make Liquid Nitrogen Ice Cream?", Helpscience Technology, http://www.helpscience.com/know_chem5.htm (Accessed Apr. 24, 2008) (2 pages).

Student Affiliates, American Chemical Society, Department of Chemistry, University of Maine, located at http://www.chemistry.umeche.maine.edu/Department/ACS.html, dated May 3, 2005 (Accessed Apr. 24, 2008) (6 pages).

Sam Barros, "Liquid Nitrogen Ice Cream!", Copyright 2000-2002 (Accessed Apr. 17, 2008) (2 pages).

Liquid Nitrogen Ice Cream, available at http://www.everything2.com/index.pl?node_id=466728, dated Mar. 25, 2000 (Accessed Apr. 17, 2008) (3 pages).

Carmen Cerra, "Ben and Jerry, meet Tom and Will," Iowa State Daily, Liquid Nitrogen Ice Cream A cool Idea—Science & Tech, Jan. 31, 2002 (8 pages).

DocBug: Liquid-Nitrogen Ice Cream, "Liquid-Nitrogen Ice Cream," dated Nov. 26, 2004, available at http://www.docbug.com/blog/archives/000233.html (Accessed Apr. 17, 2008) (6 pages).

The Australian National University, The BOC Liquid Nitrogen Show, Online Article located at www.questacon.edu/au/html/assets/pdf/Liquid_Nitrogen.pdf, Commonwealth of Australia, 6 pages.

* cited by examiner

APPARATUS FOR AND METHOD OF MAKING A FROZEN CONFECTIONERY PRODUCT

FIELD OF THE INVENTION

This invention relates to apparatus for and methods of making confectionery products, and in particular to apparatus for and methods of making instant frozen confectionery products fresh to each customer's order.

BACKGROUND OF THE INVENTION

Ice cream, one of many frozen confections, is a well known and favourite desert of millions of people. It is commonly prepared by mixing ingredients such as milk, dairy products, sugar, emulsifying agents, stabilizers, colorants and flavouring agents, sometimes in admixture with solid ingredients that are to be dispersed through the final product, agitating the ingredients while they are chilled and then freezing the mixture.

Ice cream is generally available in two varieties: hard packed and soft serve. Hard packed is the traditional ice cream that can be purchased in containers and stored in a freezer and then dispensed, usually by scooping the product with a scoop. Soft serve ice cream is the type that may be dispensed from a machine and has a softer, creamier consistency.

Restaurants that produce soft serve ice cream usually have one or two flavours available, and the ice cream is constantly being produced in a soft serve machine and is dispensed when requested by a customer. Machines hitherto used for this purpose have a few drawbacks. First, since the soft serve ice cream mix is initially in a liquid form, it must be frozen in the machine, which consumes a lot of energy. Second, when many deserts are produced in quick succession, the consistency of the dispensed product becomes less stiff since the freezer in the machine can not freeze the new incoming mix immediately and has a problem achieving the necessary temperature to produce the ice cream. Third, cleaning the machines is time consuming and costly, sometimes wasting product in the process. These problems pose a real problem for high volume outlets which require more than one machine in order to be able to produce soft serve ice cream at high volumes.

While soft serve ice cream is very popular, traditional hard packed ice cream is still appealing to many people. However, much of the ice cream sold at a café or an ice cream shop is supplied to the shop in a big batch from a bulk supply produced days before a customer's order. Shops that make their own ice cream often do so well prior to a customer's order. Therefore, ice cream may be hours or days old by the time it is served. Additionally, while a variety of toppings may be available, the flavours of the ice cream product are predetermined and the production of customised flavoured ice cream is not possible.

Further the consistency of both soft serve and hard packed ice cream varies greatly. The consistency of the soft serve is dependant on the volume being produced and the consistency of the hard pack depends greatly on the temperature at which the product is stored. Thus, it is not possible for a consumer to dictate the required consistency in the confectionery product.

U.S. Pat. No. 5,098,732 to Inagaki and U.S. Pat. No. 6,510,890 to Paskach, the teachings of which are incorporated herein by reference, teach apparatus for and methods of producing an instant frozen confectionery product. However, in each case the apparatus suffers the disadvantage that product produced has direct contact with parts of the machinery. Thus, if the apparatus is used to make custom flavours, the machines should desirably be cleaned between serving one customer and serving the next, in order to ensure there is no cross-contamination of flavours. In a busy outlet this is not practical.

OBJECTS OF THE INVENTION

An object of the present invention is to provide apparatus for and methods of producing frozen confectionery products in a short time from fresh ingredients and to customers' requirements.

Another object is to provide such apparatus and methods wherein the ingredients only contact disposable parts of the apparatus.

A further object is to provide such apparatus and methods wherein customised frozen confectionery products are produced to have varying hardness or consistency, depending upon the customer's requirement.

SUMMARY OF THE INVENTION

According to the present invention, a method of producing a single serving of a frozen confectionery product comprises the steps of measuring into a disposable container a volume of confectionery mix; positioning a disposable agitator to extending at least partially into the confectionery mix in the container; adding a volume of liquid gas to the confectionery mix in the container; creating relative motion between the container and agitator to agitate the liquid gas and confectionery mix in the container until the liquid gas has evaporated; cooling and freezing the confectionery mix in the container through the transfer of heat from the confectionery mix to the liquid nitrogen and through use of the latent energy of evaporation of the liquid gas; and then removing the container holding the resulting frozen confectionery and the disposable agitator for consumption of the frozen confectionery.

The step of positioning a disposable agitator advantageously extends at least partially into the confectionery mix in the container an agitator having a substantially scoop shaped portion to that, when the agitator is removed along with the container, it may be used to scoop the frozen confection from the container to facilitate its consumption.

To measure a volume of confectionery mix into the disposable container, a user may manually add the confection mix to the container and then place the container in a device that adds the liquid gas and agitates the mixture of liquid gas and confectionery mix. Alternatively, the container may be placed in the device, which then automatically dispenses into the container the confectionery mix and any flavour additives prior to introduction of the liquid gas and agitation.

Creating relative motion between the agitator and disposable container may be accomplished by securing the container in fixed position and moving the agitator. Alternatively, the agitator may be in fixed position and the container moved, or both the agitator and container may be moved. When the relative motion of the agitator and disposable container is provided by securing the container in fixed position and moving the agitator, the agitator is rotated and, preferably, is rotated in an epicyclic motion. The relative motion of the agitator is commenced prior to introducing the liquid gas to the confectionery mix and the amount of liquid gas added is varied in accordance with a desired consistency of the resulting frozen product. To obtain the desired consistency, an initial set volume of liquid gas is added and then smaller amounts are subsequently added until a confectionery product of desired consistency is obtained.

The invention also contemplates an apparatus for producing a single serving of a frozen confectionery product, comprising a supply of liquid gas; a support for removably holding a disposable container that contains a volume of unfrozen confectionery mix; a holder for releasably holding a disposable agitator so that the agitator extends into the container and at least partially into the confectionery mix; a valve for controllably dispensing a volume of liquid gas into the confectionery mix in the container; motor means for imparting relative motion between the container and agitator to agitate the admixture of confectionery mix and liquid gas in the container; and a control system for controlling the valve and motor means to agitate the confection mix in the container while the liquid gas dispensed into the confectionery mix evaporates, thereby simultaneously cooling and aerating the confection mix to produce a frozen confectionery product.

The unfrozen confectionery mix may be introduced into the disposable container by the operator before the container is held by the support or by the apparatus after the container is held by the support. For the case where the confection mix is introduced into the container after it is held by the support, the apparatus includes means for containing a reservoir of liquid confectionery base product and a valve coupled to the reservoir for metering a volume of unfrozen confectionery base mix into the container. Preferably, the means for containing comprises a refrigerated compartment of the apparatus for receiving the reservoir of liquid confectionery mix.

To further utilize the cold gas vapour escaping from the confectionery mix in the container upon evaporation of the liquid gas, the apparatus has ducts above the container and fans to draw into the ducts the cool gas escaping the container. The ducts deliver the cold gas to the refrigerated compartment containing the reservoir of confectionery mix to chill the mix. Ducts also are provided for flow of the gas from the refrigerated compartment and discharge of the gas into the atmosphere.

The apparatus may include a flavour addition system for selectively adding one or more of a number of flavour concentrates to the liquid confection mix in the disposable container while the container is on the support. A user operable control system is provided to control the timing of the introduction of the flavour concentrates and to confection mix in the container.

The valve for dispensing the liquid gas and, where applicable, valves for dispensing unfrozen liquid confectionery base product mix and any flavours, are positioned in the apparatus so as to dispense their respective substances from above the disposable container, so that there is no contact between product in the container and the valves, thus preventing cross contamination of flavours between one product and the next.

So that a frozen confection might be prepared to a desired consistency, the apparatus desirably includes means for monitoring the consistency of the product as it is cooled and freezes. In one embodiment, the monitoring means is responsive to the torque of a rotary output shaft connecting the motor means to the disposable agitator. In another embodiment, the motor means is an electric motor and the monitoring means is responsive to the magnitude of current drawn by the electric motor. In yet another embodiment, the means for monitoring comprises an adjustable slip clutch coupled between the motor output shaft and the agitator, with the clutch being set to slip at a predetermined torque that corresponds to a specific consistency of the frozen confection product. In the case of the latter embodiment, also included are means for detecting when slippage of the clutch occurs.

The supply of liquid gas advantageously comprises a Dewar vessel for storage of a volume of liquid gas product. A sensor within the Dewar vessel detects minimum and maximum levels of liquid gas in the vessel, and means are provided for maintaining a volume of liquid gas within the Dewar vessel. The arrangement is such that when a selected minimum level of liquid gas in the Dewar vessel is reached, the Dewar vessel is refilled until the level of liquid gas reaches a selected maximum level.

The foregoing and other objects, advantages and features of the invention will become apparent upon a consideration of the following detailed description, when taken in conjunction with the accompanying drawings.

BRIEF DESCRIPTION OF THE DRAWINGS

Embodiments of the invention will now be described, by way of example only, with reference to the accompanying drawings in which.

DETAILED DESCRIPTION

Figure 1:
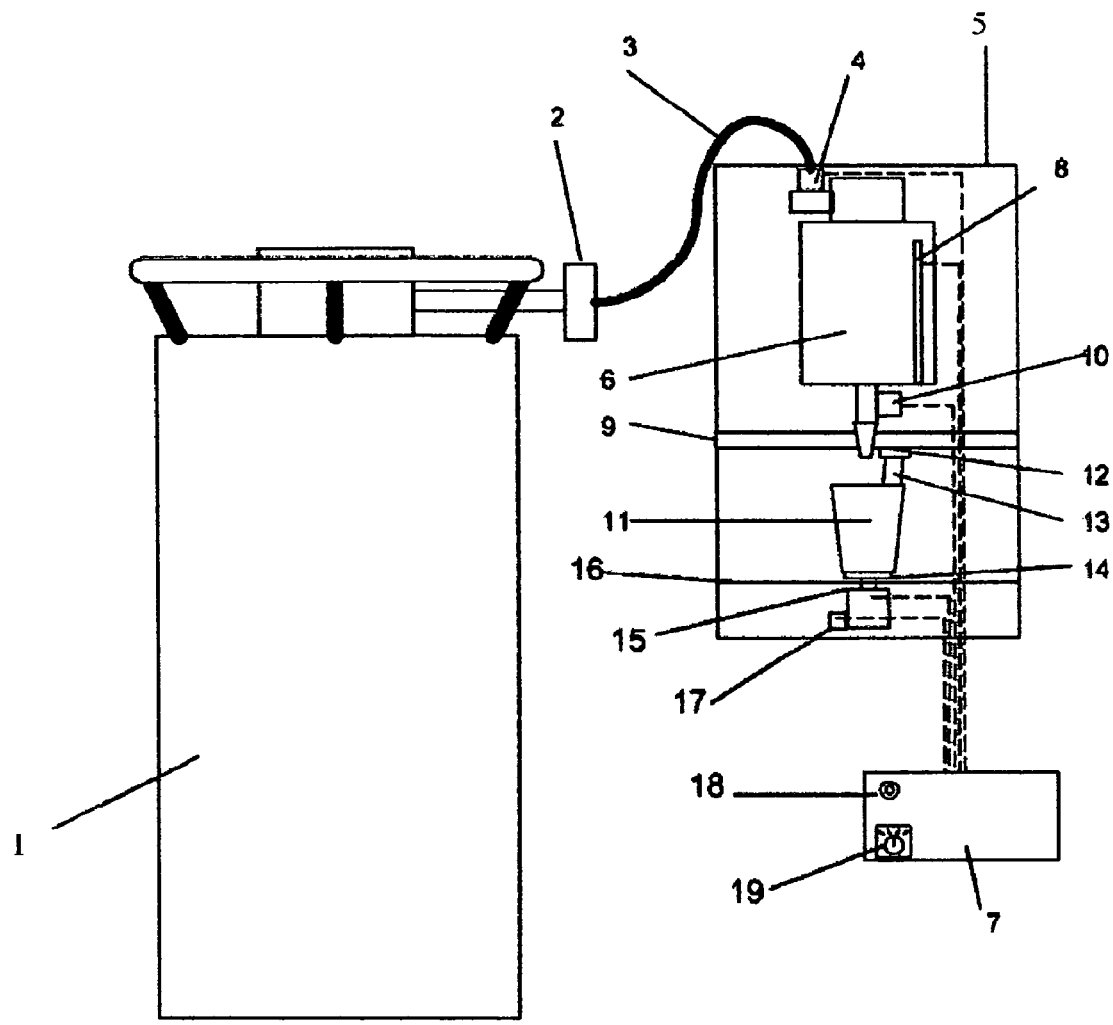
FIG. 1 is a front view of one embodiment of the invention.

There is shown in FIG. 1 a preferred embodiment of apparatus or machine embodying the teachings of the present invention. In this embodiment, a liquid nitrogen cylinder 1, which may be a standard 160 litre (42 gallon) pressurized cylinder, is connected to an inlet to a safety release valve assembly 2, an outlet from which connects to a vacuum sealed cryogenic hose 3. Safety release valve assembly 2 is of a known type that maintains communication between its inlet and outlet but activates on its own to vent nitrogen from the system whenever pressure in the system exceeds preset safety levels, thereby to maintain system pressure to be no greater than a maximum preset level. Hose 3 may also be any other variety of hose approved for cryogenic use and may be insulated by foam or other suitable insulating material.

Hose 3 is attached to an inlet to a cryogenic solenoid valve 4 contained within a housing or case 5 of the machine, case 5 being made of a thin material, preferably metal but alternatively of any other material commonly used in food processing machine casings, and serving to protect the interior of the machine. An outlet from solenoid valve 4 is attached to an inlet to a Dewar vessel 6 for holding liquid nitrogen, and valve 4 is also connected electrically to a control box 7. Valve 4 is preferably a two way normally closed valve, but other cryogenic valves may be used.

Dewar vessel 6 can be a small commercial Dewar vessel or be fabricated from common materials, for example a plastic container surrounded by an appropriate foam insulation. Inside Dewar vessel 6 is a cryogenic capacitance liquid level sensor 8 with an electrical connection to control box 7. Other methods of determining liquid level and therefore liquid volume in Dewar vessel 6 may be used, for example a float sensor or visual scale. A horizontal strut 9 supports Dewar vessel 6 inside case 5. The strut can be made of any structurally sound material used to provide both strength to case 5 and support to the internal elements of the system.

At a lower outlet from Dewar 6 is a cryogenic solenoid valve 10 that is electrically connected to control box 7. Valve 10 is controlled to allow liquid nitrogen to selectively flow through the outlet from Dewar vessel 6 into a removable disposable container 11 positioned below the outlet. Also connected to strut 9 is a motor assembly 12 which releasably receives and holds a disposable agitator 13. The agitator 13 is of an elongate shape and at least a portion of the agitator is advantageously formed to be capable of performing the function of acting as a scoop device to aid consumption of product by a customer.

Disposable agitator 13, when positioned on the machine and held by the motor assembly 12, extends at a lower end at least partially into container 11 that may be, for example, a twelve ounce hot beverage paper cup, although other types of suitable containers may be used. In the presently described embodiment of the invention a paper cup is used, because such a cup is manufactured from two pieces joined at the bottom to leave a thin cylinder at the base of the cup that fits on a container holding assembly 14 that may be an aluminium or other suitably stiff material disk that is sized to sit just inside of the bottom lip of container 11. Preferably, the container holding assembly 14 has a slight taper enabling the container 11 to sit snugly upon it.

Container holding assembly 14 is attached to a motor 15 that is connected electrically to control box 7 and mounted at its upper end to a strut 16. Between the mounting of motor 15 and strut 16 is a torque sensor 17 that is connected electrically to control box 7.

Control box 7 preferably contains a programmable microcontroller, although any other suitable activating system may be used. For example, a simple system of switches could be used to activate each of the various system components electrically connected to control box 7. Control box 7 has a consumer interface that includes a hardness selector 18 and start button 19.

In operation of the apparatus to produce a single serving of a frozen confectionery product, a disposable cup or container 11 containing a measured amount of unfrozen liquid ice cream mix is placed onto container holding assembly 14 and a disposable agitator 13 is removably connected with motor assembly 12, such that a lower end of the agitator extends at least partially into the ice cream mix in container 11. In this embodiment, the ice cream mix, for example six ounces of ice cream mix, is poured into the cup before placing the cup on container holding assembly 14, although an automated ice cream mix dispensing system could be located in the machine to pour ice cream mix into the cup after the cup is positioned on container holding assembly 14. The user may also add any additional ingredients desired by the consumer, for example pieces of fresh fruit, candy, etc.

With container 11 in place on container holding assembly 14, the user indicates his/her hardness preference on the control box hardness selector 18 and then presses start button 19 to starts the process and initially direct the microcontroller within the control box 7 to first activate cup spinning motor 15 and agitator motor assembly 12. The combined relative motions imparted to disposable agitator 13 and container 11 by respective motors 12 and 15 provides an epicyclic motion of the disposable agitator through the unfrozen confection mix. Alternatively, just one or the other of container 11 or agitator 13 can be moved by its associated motor while the other remains stationary, or a single motor can be used to rotate just one or both of the container and agitator.

Next, the microcontroller of control box 7 activates cryogenic solenoid valve 10 to release a predetermined length pulse or volume of liquid nitrogen from the Dewar vessel 6 into the ice cream mix contained in spinning cup 11 to cool and freeze the mixture. The volume of liquid nitrogen is emitted from valve 10 as a liquid stream that is directed into the unfrozen liquid ice cream mix in cup 11, although there may be a short conduit leading from an outlet from the valve to the cup, depending upon the position of the Dewar vessel and valve relative to the cup, but either way the stream of liquid nitrogen is essentially introduced from above into the unfrozen liquid confectionery mix in the cup. Since at this point the disposable agitator 13 and cup 11 are already moving, as the stream of nitrogen impacts and is added to the ice cream mixture in the cup it is effectively mixed in with the liquid confectionery mix. Cup 11 will continue to spin for a predetermined length of time and additional pulses of liquid nitrogen may be emitted, as necessary, from solenoid valve 10 into the ice cream mix in the rotating cup.

As liquid nitrogen within Dewar vessel 6 is consumed by the process, the level of nitrogen will reach a lower limit in the vessel, whereupon level sensor 8 will send a signal to controller 7 to cause the controller to open solenoid valve 4 to refill Dewar vessel 6 from cylinder or tank 1 until an upper limit of level sensor 8 is reached, at which point valve 4 is closed.

Motors 12 and 15 continue to be operated to rotate container 11 and agitator 13 and thereby agitate the ice cream mix in the container as liquid nitrogen introduced into the ice cream mix evaporates, whereupon the ice cream mix is cooled by a transfer of heat from the mix to the liquid nitrogen, with gasses produced by evaporation of the nitrogen passing through the mixture to simultaneously aerate as well as cool and freeze the confectionery mix as a result of a heat exchange process that occurs from the latent heat of evaporation of the nitrogen. The hardness to which the resulting confectionery product is brought is dependant upon the volume of liquid nitrogen introduced into and evaporated within the ice cream mix in container 11. After an initial volume of liquid nitrogen is added to container 11, additional pulses of liquid nitrogen are added, as necessary, until a selected hardness of the confectionery is reached. The occurrence of additional pulses of liquid nitrogen into the ice cream mix is determined by the setting of hardness selector 18 of control box 7. Should the user indicate select a harder frozen confection, the microcontroller will dispense more pulses of liquid nitrogen into the ice cream mix in container 11, while if the user selects a softer frozen confection, fewer pulses of liquid nitrogen will be introduced into the ice cream mix. The hardness of the confectionery product is measured by torque sensor 17 that provides feedback to the microcontroller of control box 7, and when a predetermined torque is sensed, which is of a magnitude in accordance with the setting of hardness selector 18, the frozen confection making process is ended. The operator can remove both container 11 and agitator 13 from the device and enjoy the fresh frozen confection product. Preferably, a lower portion of agitator 13 that extends at least partially into the confectionery product is substantially scoop shaped and the agitator when removed is served to the consumer with the product, so that the consumer can then use the disposable agitator to scoop the product from container 11 to facilitate consumption of the product. Agitator 13 and container 11 are then disposed of.

For the arrangement thus far described, the operator adds liquid base confectionery product mix to the container 11, plus any flavourings and/or additives required by the customer, to provide a customised flavour. The operator then places the container into the apparatus and begins the freezing process. This separation of ingredient preparation from the freezing apparatus enables a much smaller apparatus to be used, which is advantageous where there may be a limited amount of counter space available.

Figure 2:
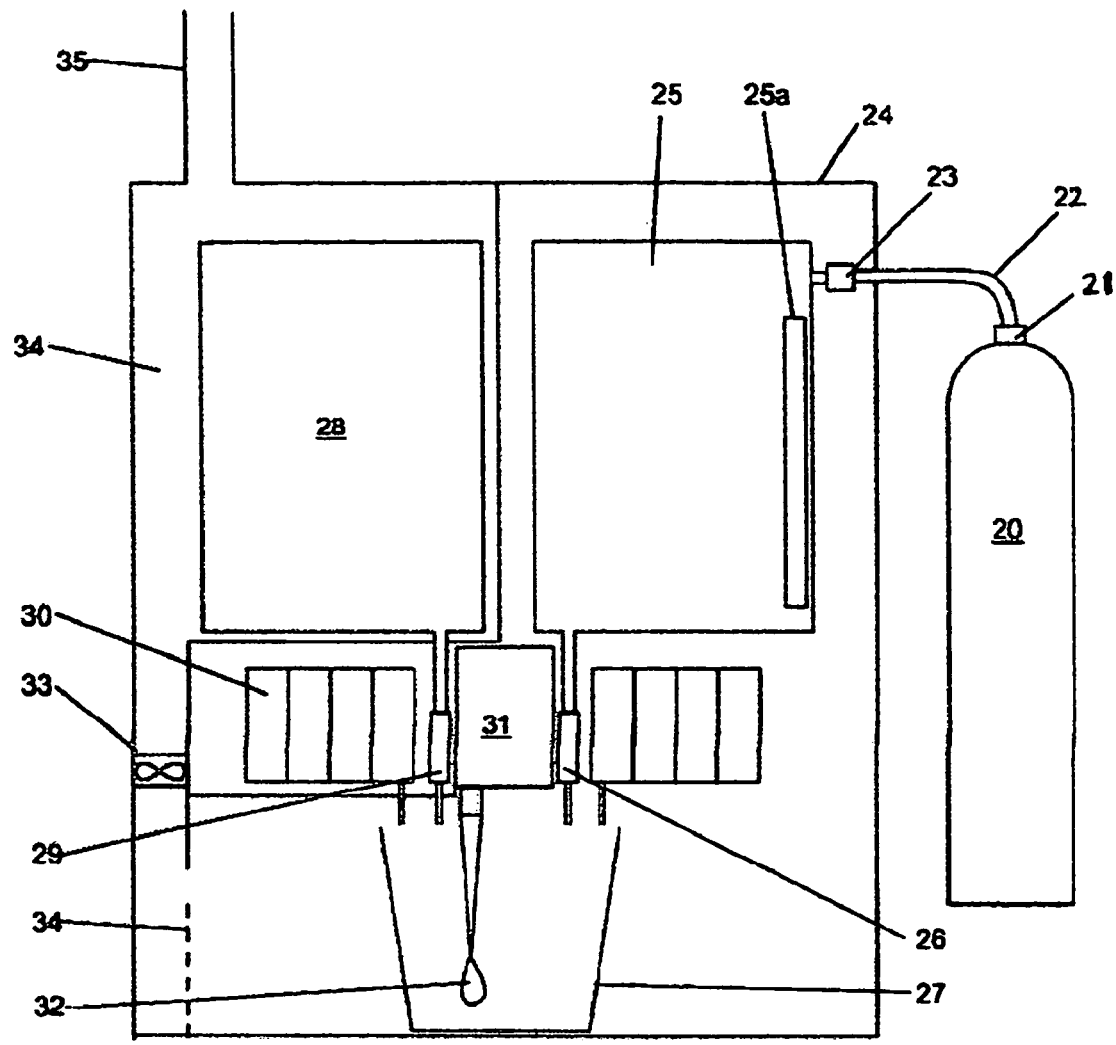
FIG. 2 is a schematic representation of another embodiment of the invention.

FIG. 2 shows an alternative embodiment of machine embodying the teachings of the present invention, in which a liquid nitrogen cylinder 20 is connected through a safety release valve assembly 21 to a vacuum sealed cryogenic hose 22. Hose 22 may also be any other variety of hose approved for cryogenic use and can be insulated by foam or other material.

Hose 22 couples liquid nitrogen at an outlet from safety release valve assembly 21 to an inlet to a cryogenic solenoid valve 23 contained within a case 24 of the machine, the solenoid valve being attached to a liquid nitrogen Dewar vessel 25 for introducing liquid nitrogen into the vessel and also being connected electrically to a controller (not shown for clarity), such as a controller of a type referenced at 7 in FIG. 1. Inside Dewar vessel 25 is a cryogenic capacitance liquid level sensor 25a that is electrically connected to the controller. The case 24 may be fabricated from a number of different panels including removable sections or doors for access to the components contained within the case.

Leading from the bottom of Dewar vessel 25 is a cryogenic solenoid valve 26 that is electrically connected to and operated by the controller. Valve 26 is controlled to allow pulses or streams of liquid nitrogen to selectively flow from Dewar vessel 25 for introduction into liquid confectionery mix contained in a removable disposable container or cup 27 positioned below valve 26.

Situated within case 24 of the machine is a reservoir 28 containing unfrozen liquid confectionery base mix, e.g., unfrozen liquid ice cream mix. Reservoir 28 advantageously is disposable and may be of a bag or a bag in box type commonly used in beverage dispensers.

Leading from an outlet from reservoir 28 is a conduit for delivery of confectionery mix from the reservoir into removable container or cup 27 via a control valve 29, which is electrically coupled to and actuation of which is controlled by the controller to dispense a predetermined quantity of confectionery base mix into container 27 through an open upper end of the container.

Also situated within case 24 of the machine is a plurality of containers 30 containing flavour concentrates for admixture to base confectionery mix in container 27, as dictated by a consumer. These flavours may be added to the base confectionery in cup 27 prior to a chilling and freezing process and blended during chilling and freezing to produce a homogeneously flavoured confection product or they may be mixed into the base confection mix when it is at least partially frozen to produce areas of separate flavour within the finished frozen confection product. Preferably, the flavour containers 30 are fully disposable and each contains a suitable reservoir of concentrate as well as a pumping or dosing means for dispensing metered amounts of the flavours. A motor 31 for providing an epicyclic output has an agitator 32 removably attached to a shaft extending therefrom. Motor 31 is operated by the controller and included are means to monitor current being drawn by the motor, which current monitoring means may be part of the controller. Agitator 32 extends at least partially into confectionery mix in container 27 and agitates and mixes the product therein, and advantageously the agitator is configured so that it can also be used by a consumer to scoop the frozen confection product from the cup for consumption.

In use of the apparatus to produce a frozen confection, the user inputs into an operator interface (not shown) of the controller any flavour concentrates desired to be introduced into the confection mix and begins the process of producing the confection, initial steps of which process are placement of a container 27 on the machine and removable attachment of an agitator 32 to the output of motor 31, such that the agitator extends downward at least partially into the container. Upon initiation of the controller by the user, the machine dispenses liquid confectionery base mix from reservoir 28, together with any flavours selected by the consumer from flavour containers 30, into the container 27 in appropriately metered quantities. Motor 31 is then energized to epicyclically rotate agitator 32 to commence agitation and mixing of the product in container 27, whereupon valve 26, if not previously opened, is opened for a set period of time to allow a quantity of liquid nitrogen to flow from Dewar vessel 25 into container 27 for mixing with the confectionery mix in a manner as above described. The liquid nitrogen immediately starts to evaporate, thereby simultaneously cooling and aerating the confection product. Optionally, and depending upon the desired consistency of the resulting product, selected additional amounts of liquid nitrogen can be added to the mix during the process as required, so that the heat exchange that occurs as a result of a transfer of heat from the mix to the liquid nitrogen and from the latent energy of evaporation of the liquid nitrogen freezes the confection mix to an extent determined by the volume of liquid nitrogen introduced into the confection mix, thereby to yield a desired consistency of the final frozen product. As the nitrogen evaporates and leaves the mix the cold nitrogen gas is drawn by a fan 33 through a grille 34 into the interior of the machine case 24 where it passes through an insulated refrigeration compartment or area 34 containing the liquid confectionery base mix reservoir 28 to refrigerate the confectionery mix, following which the nitrogen gas flows out of a vent 35 for ducting to an appropriate dump location.

As the product is cooled through the heat exchange process that occurs with the liquid nitrogen, the product starts to freeze and thicken, throughout which process agitator 32 agitates the product. During agitation, the motor speed may be kept constant and the magnitude of the current drawn by the electric motor 31 may be monitored by the controller and used as an indication of the stiffness of the product. In other words, as the liquid confectionery mix thickens and freezes, the torque required to be output by motor 31 to continue to rotate agitator 32 increases, which in turn increases the current drawn by the motor. When the current drawn reaches a specific level indicative that the desired consistency of the product has been reached, the controller terminates the freezing process and the user removes container 27 containing the product and agitator 32, which agitator may then be served to a customer along with the frozen confection in the container and used as a scoop to consume the product, whereby the agitator economically serves double duty.

Other techniques can be used to detect confection consistency. For example, it is contemplated that reaching the desired consistency of the confection can be determined by maintaining a fixed input voltage to the motor and monitoring motor speed, with motor speed then being inversely proportional to and indicative of the consistency, such that when motor speed drops to a certain rpm, it is known that the desired consistency has been reached. Alternatively, a fixed power input can be provided to the motor, with stalling of the motor then indicating that the desired consistency has been reached. On the other hand, if motor conditions are not to be monitored, then a breakaway agitator can be used, which agitator cleanly snaps from its holder when the desired consistency is reached, in which case the operator would have a collection of agitators/spoons to select from.

It is understood that while the invention has been described in terms of using liquid nitrogen to chill and freeze the confectionery product, any other suitable liquid gas could be used for the purpose. Also, while detecting the consistency of the frozen confectionery product has been described in terms of measuring the torque exerted on the disposable agitator or the magnitude of the current flow drawn by a motor, it is contemplated that product consistency can be determined by other suitable means, such as by use of an adjustable slip clutch at an output from a motor driving the agitator. In this case, the clutch would be set to slip at a predetermined torque that corresponded to a specific consistency of the frozen product, and the apparatus could then advantageously include means for detecting when clutch slip occurs and for signalling a user of that event.

While embodiments of the invention have been described in detail, various modifications and other embodiments thereof may be devised by one skilled in the art without departing from the spirit and scope of the invention, as defined in the appended claims.

What is claimed is:

1. A method of making a confectionery frozen product, comprising:
   (a) supplying liquid gas from a supply tank to an intermediate vessel and temporarily storing said liquid gas in said intermediate vessel;
   (b) setting a controller with a desired consistency level for said confectionery frozen product;
   (c) said controller initiating the movement of both an agitator and a receiving container, wherein said agitator is movable within said receiving container and wherein said receiving container contains a confectionery mix;
   (d) said controller initiating the release of a predetermined initial volume of the liquid gas from said intermediate vessel into said receiving container;
   (e) said controller subsequently initiating the release of a predetermined sequence of pulses from said intermediate vessel into said receiving container, wherein each of said pulses in said sequence of pulses have a predetermined pulse length or volume of the liquid gas; and
   (f) sensing a predetermined setting corresponding to the desired and set consistency level of the confectionery frozen product and discontinuing said release of said sequence of pulses by said controller when the sensed predetermined consistency setting reaches the desired and set consistency level,
   wherein (i) the predetermined initial volume of the liquid gas, (ii) the predetermined sequence of pulses and (iii) the predetermined pulse length or volume of pulses of liquid gas are determined by said controller and from the consistency level set for the confectionery frozen product, and
   wherein said controller ensures the maintenance of the level of liquid gas in said intermediate vessel such that the liquid gas in said intermediate vessel maintains within a preset volume level to facilitate said release steps.

* * * * *